United States Patent [19]

Adams

[11] Patent Number: 4,860,124

[45] Date of Patent: Aug. 22, 1989

[54] COMBINED TAXIMETER AND CASSETTE OR DISK PLAYER

[75] Inventor: Jürgen Adams, Villingen-Schwenningen, Fed. Rep. of Germany

[73] Assignee: Mannesmann Kienzle GmbH, Fed. Rep. of Germany

[21] Appl. No.: 89,323

[22] Filed: Aug. 25, 1987

[30] Foreign Application Priority Data

Sep. 20, 1986 [DE] Fed. Rep. of Germany ....... 3631994

[51] Int. Cl.$^4$ ................ G07B 13/00; G07C 5/08; G11B 5/00
[52] U.S. Cl. ............................ 360/6; 364/467; 235/30 R
[58] Field of Search ............... 360/5, 6, 12, 53, 59; 369/21, 6; 364/467; 235/30 R

[56] References Cited

U.S. PATENT DOCUMENTS

| | | | |
|---|---|---|---|
| 3,909,842 | 9/1975 | Noji | 369/21 |
| 3,970,827 | 7/1976 | Ikuta et al. | 235/30 R |
| 4,281,354 | 7/1981 | Conte | 360/5 |
| 4,426,691 | 1/1984 | Kawasaki | 369/21 |
| 4,496,996 | 1/1985 | Moriyama et al. | 360/12 |
| 4,533,962 | 8/1985 | Decker et al. | 360/6 |
| 4,590,571 | 5/1986 | Larsen | 364/467 |
| 4,602,127 | 7/1986 | Neely et al. | 360/53 |
| 4,731,769 | 3/1988 | Schaefer et al. | 369/6 |

*Primary Examiner*—Robert L. Richardson
*Assistant Examiner*—James E. Tomassini
*Attorney, Agent, or Firm*—McGeady Toren

[57] ABSTRACT

A vehicle information apparatus for recording, computation and display of data ascertainable from the driving performance of a motor vehicle. The apparatus includes a transmitter module for providing data concerning a trip, a central unit with internal program and data memories and a display device. The vehicle information apparatus is coupled with the operating mechanism of a radio cassette set for playback of data information stored on an audio data carrier. The transmitted data are separated in a signal input and output stage of the apparatus, stored and displayed. The audio data carrier is repeatedly loaded with topical information and serves particularly for the distribution of instructions prior to the start of a driver's shift in a taxi or transportation vehicle fleet.

14 Claims, 2 Drawing Sheets

COMBINED TAXIMETER AND CASSETTE OR DISK PLAYER

BACKGROUND OF THE INVENTION

1. Field of the Invention

The invention relates to an arrangement for a vehicle information apparatus for recording, computation and display of data determinable from a trip performance, consisting of a transmitter module for providing data dependent on that vehicle, a central unit with an internal program memory and a data memory, and a display terminal.

2. Description of Related Art

Apparatus of this type are associated with the field of vehicle information devices such as taximeters and tachographs, which acquire various data relevant for trip performance as a function of trip distance-time parameters, store the same, compute and display specific results by means of computation processes inside the apparatus, and which print out a selection of results by selective assignment of a print-out module. It is thus known, for instance, that in a taximeter, an appropriate series of pulses is entered into the taximeter apparatus by means of a connection of a transmitter module with reference to the actually driven travel distance, which series of pulses is converted in a computer unit to travel distance units and, furthermore, into trip price units which have to be collected for the same. In addition, data specific to the taximeter are stored ready for retrieval in the form of control counters through various summing counters. This data can be depicted in a large area display by appropriate actuation of keys. The functional mode of such an information device recording the trip performance of a taxi vehicle is essentially determined by a microprocessor system with an integrated ROM (read-only memory) for the operational system and with an integrated RAM (random access memory) for the variable data of the tariff programs and adaptation to the vehicle parameters.

Viewed overall, however, the useful output of the previously known taximeter apparatus is limited to the acquisition of data and supply of information which refers solely to the operational mode of the vehicle controlled by the taximeter apparatus.

The situation with tachographs is similar, wherein the entire driving behavior of the vehicle, extending throughout hours and days, is recorded, as a function of the elapsed clock time, by means of multiple inscriptions upon a tachograph disk. The evaluation of a disk inscribed in this manner and equipped with a basic matrix leads to a multilayered information about, for instance, the speeds driven, the driving mode, the travel distances, periods worked or the time a driver spent at the wheel, etc. In this device is also a transmitter module, which enters information, characterizing the driving behavior and the travel distance in the form of pulse sequences, into the tachograph and which thus stores and displays all essential information concerning the travel distance driven, by means of inscription as a function of time.

This device also supplies, as an information device, merely data on which, for instance, economic or efficiency calculations concerning the actual utilization of a vehicle can be based. Even if the display is expanded in the manner of a monitor, the useful effect remains limited to the display of the momentary condition.

As is evident from the presentation of the known vehicle information devices, for instance a taximeter and the tachograph, the information content of the she appliances is strictly delimited for special use and, in a taximeter, is limited to the determination of a fare price and the storage of several added-up driving performance data, and, in case of the tachograph, the imparting of the information exhausts itself in the graphical curve diagram inscription of the details about the manner of driving across long distances and the time. In the most recent way of viewing things, this is insufficient in order to satisfy all the requirements of a client on service trips, or in order to achieve an optimum utilization of route distance and time. It therefore is imaginable to expand the informational volume of the previously known devices, for instance, according to viewpoints, which alleviate the handling of the fare orders based on additional information and which assist in increasing the efficiency.

SUMMARY OF THE INVENTION

It is an object of the invention to expand a vehicle information apparatus of the stated type in a manner in which topical information and data can be individually entered into the vehicle information devices by means of variable and externally loadable data memories.

This object is achieved in an arrangement for a vehicle information apparatus for recording, computation and display of data ascertainable from the driving performance, consisting of a transmitter module for providing data depending on the vehicle, a central unit with an internal program memory and a data memory and a display terminal, characterized in that an operating mechanism for the restitution of information stored in an audio data carrier is simultaneously connected with the vehicle information apparatus in such a way that digital data stored in the audio data carrier are transmittable to the vehicle information apparatus and are displayable.

It is appropriate in a vehicle information device not to enter additional data and information by means of a keyboard, but rather to utilize known storage means. Particularly, if this additionally acquirable data information deals with variable and voluminous sets of data, it is advantageous to use data carriers which are distinguished by simple handling as for as acceptance and restitution are concerned. Since, almost without exception, a radio cassette set is installed in each vehicle, there exists the possibility of making use of the cassette operating mechanism, without any particular additional expenditure, in order to play back a standard cassette loaded with data and information as a data source. Because of the possibility of separating digital data and speech/music information in the vehicle information device, for instance, in the central computer unit of a taximeter, a fixed connection between the speaker output of the radio cassette set and the taximeter data input according to the example can be accomplished. The user, for example the taxi driver, can transmit data to the taximeter in the example by playing back the cassette, wherein for support also spoken instructions can be recorded on the audio data carrier or the magnetic tape upstream of the data blocks.

A series of additional uses is achievable by expanding the display arrangement of the vehicle information apparatus and constructing it as a modular point-matrix display with drafting capabilities. With reference to a taximeter, there can occur, for instance, display of train or flight schedules, so that the taxi driver can always offer topical data as a special service. The updating of the data which can be played back from the audio data carrier can, for instance, occur by daily, or possibly hourly, changing of the data carrier, for instance in the form of a magnetic tape cassette, wherein said cassette on its part can be kept up to date very economically by a personal computer. In this manner, an increased flexibility in the imparting of information to a client can be achieved, by means of which also, in the region of tourism, all objects worth seeing and topical occurrences can be offered.

In addition, direct assistance of the taxi operation is also possible in that currency conversions can be daily brought up to date in the manner described. Herein, the data carrier magnetic tape cassette serves as an additional program data carrier as well as a data carrier for constants, which, together in the taximeter, lead to the currency conversion and display, for instance in the functional position "cash register".

The updating process described can, in all embodiments of the vehicle information device, also serves for transmitting of warning and service data. In a fleet of vehicles, the issue of data to the driver, for instance, a shift change or shift start, is possible by issuing of magnetic tape cassettes, which contain information about the changed traffic circumstances or particular pointers for the shift service.

In addition to the functions displayed, any imaginable transmittal of data and instructions is possible by the combination of the vehicle information device with a reproduction or restitution apparatus, on the basis of current audio data carriers and by means of graph capable display installations.

BRIEF DESCRIPTION OF THE DRAWINGS

An embodiment of the invention is described hereinafter with reference to the drawings, in which.

DESCRIPTION OF THE PREFERRED EMBODIMENT

Figure 1:
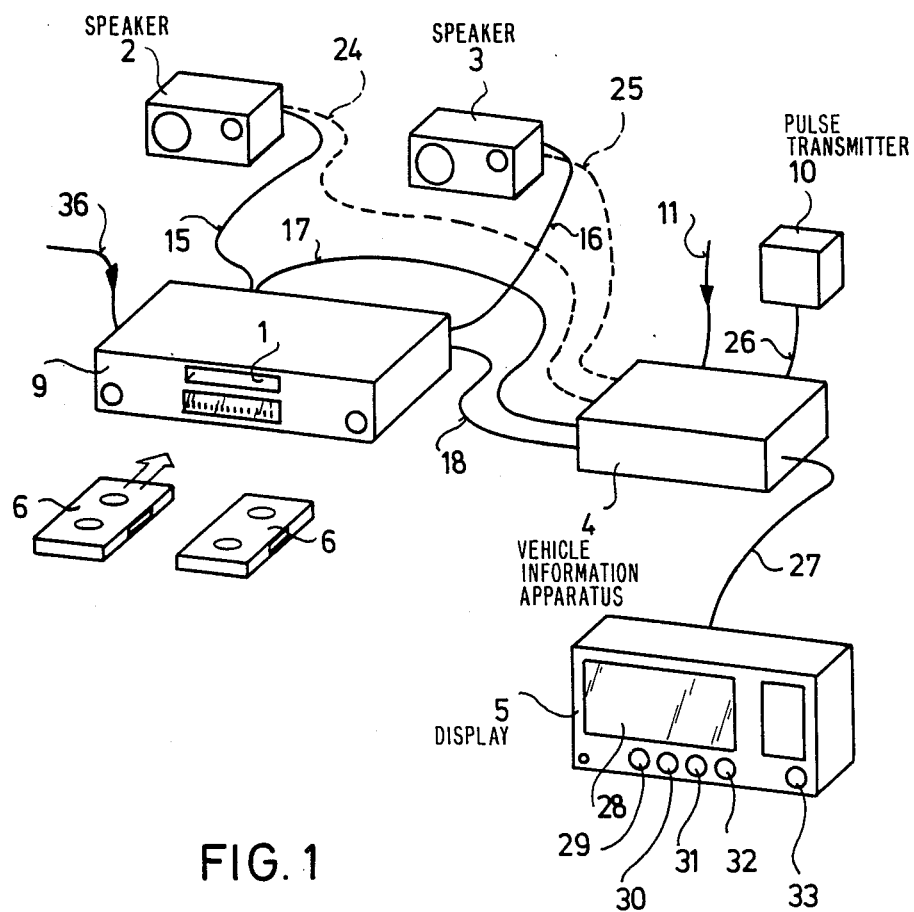
FIG. 1 shows the modular structure of a motor vehicle information apparatus coupled to a drive assembly for the restitution of information from an audio data carrier.
Figure 3:
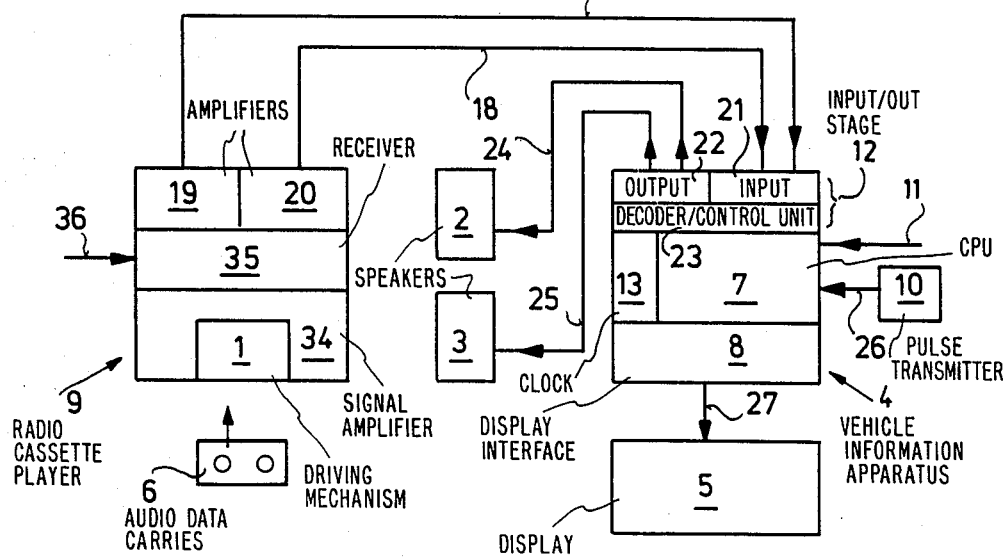
FIG. 3 is a block diagram, as in FIG. 2, however with a controlled output stage integrated into the vehicle information apparatus.

FIG. 1 shows schematically an embodiment of a vehicle information apparatus 4 which is coupled with a driving mechanism 1 of a radio cassette device 9 in modular construction. Lines 15 and 16 lead from the radio cassette device 9 at the outputs of the speaker terminal amplifiers 19 and 20, correspondingly, to two speakers 2 and 3 for transmittal of voice/music information on an audio data carrier 6, which can be a standard tape cassette or a compact disk and which is inserted into the radio cassette device 9 through an opening (not shown). Two additional lines 17 and 18 lead from the speakers 2 and 3 and amplifiers 19 and 20, parallel to the lines 15 and 16, into the vehicle information apparatus 4. In another refinement stage according to the block diagram in FIG. 3, the speaker terminal amplifiers 19 and 20 are exclusively connected to the signal input stage 21 in the vehicle information apparatus 4, which essentially serves for signal processing through filters, as will be explained later. Finally an additional refinement stage in the block diagram of FIG. 3 is modified to the extent that in the case of audio signals, undamped signals are conducted through an output stage 22 and lines 24 and 25 to the speakers 2 and 3. As can be further discerned from FIG. 3, a pulse transmitter 10 is connected through a line 26 to the vehicle information apparatus 4. The pulse transmitter 10 serves for generating and transmitting travel distance pulses into the vehicle information apparatus 4, in which are also housed modular blocks for the taximeter operation. The output side of the vehicle information apparatus 4 in FIG. 1 is connected with a separate modular display device 5 through a line 27. The display device 5 is preferably designed as a point matrix display 28 for the selective display of numbers and characters in the form of graphs. The display device 5 comprises operator controls 29 to 33 which primarily serve for operating the taximeter.

Figure 2:
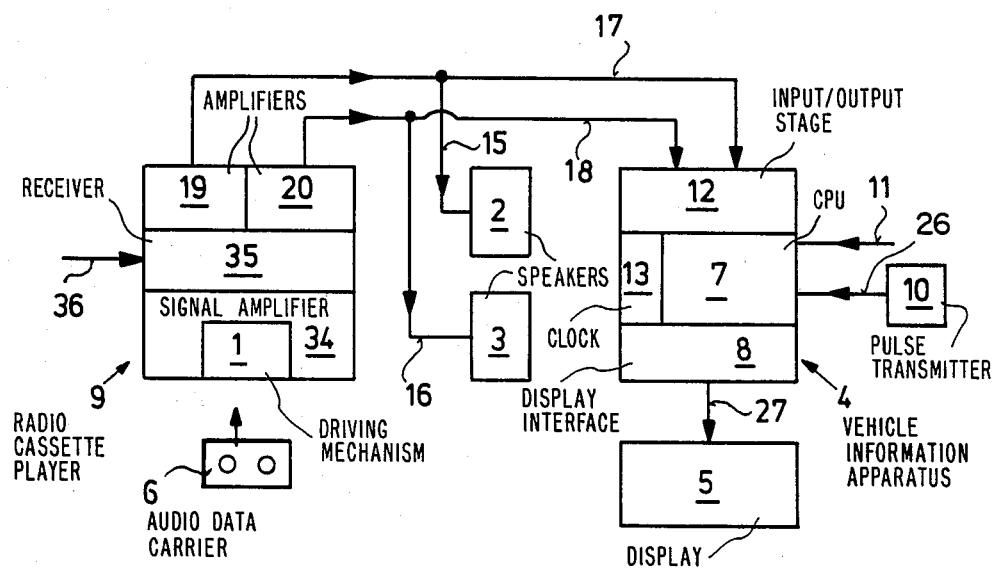
FIG. 2 is a block diagram for transmittal and parallel processing of signals from the speaker terminal amplifiers of a radio cassette restitution device.

The block diagram in FIG. 2 shows an embodiment of a vehicle information apparatus 4 combined with a radio cassette device 9, by means of which data stored in an audio data carrier 6 can be transmitted to the vehicle information apparatus 4. The driving mechanism 1, as shown in FIG. 2, is an integrated building block (not shown in detail here) of the radio cassette device 9 and consists essentially of a mechanical cassette guide, a probe and drive elements. A signal amplifier 34, including the usual control and operating units, is adjacent to the driving mechanism 1 as an additional building block. Another building block is formed by a receiver 35 with an energy supply 36, wherein the receiver 35 is internally connected to the speaker terminal amplifiers 19 and 20. The outputs of the speaker terminal amplifiers 19 and 20 are connected, on the one hand, through lines 15 and 16 to the speakers 2 and 3 and, on the other hand, through the lines 17 and 18 to a signal input and output stage 12 of the vehicle information apparatus 4. A building block 7, specifically dedicated to the taximeter, is additionally installed in the vehicle information apparatus 4, and consists essentially of a microprocessor, a memory, a network portion, and a signal input connection of the pulse transmitter 10, this block 7 serving the function of a central computer. Finally, a display interface 8 is provided adjacent to the taximeter structural group 7 for forwarding data information intended to be displayed, which display interface 8 is connected on its output side through the line 27 with the modular display installation 5 for display of data from the data tape and the data information processed by the installations 1, 6, 9 and 4, which are all displayed on the point matrix display 28. A supply line 11 to the vehicle information apparatus 4 supplies the operational voltage, ignition switching signals, radio receiving signals for the transmitter 35, status signals, and seating contact signals to the building block 7 specifically dedicated to the taximeter, etc.

The signal input and output stage 12 in the vehicle information apparatus 4 in FIG. 3 consists of a decoder and control unit 23 for the signal input stage 21 with a filter and signal processing arrangement, and for the signal output stage 22 with a damping or attenuation circuit for suppression or reduction of the signal to the speakers 2 and 3 during the data loading operation into the vehicle information apparatus 4.

The function of the signal input and output stage 12, according to FIG. 2, consists in a parallel processing of the signals from the speaker terminal amplifiers 19 and 20 to the speakers 2 and 3 in such a way that the sound volume and with it the signal amplitudes are controlled or leveled out into a processable, standard signal for further processing in the signal separation and coding unit.

Signal separation is one of the functions of the decoder, by means of which, essentially, the presence of audio or data signals from the terminal amplifiers 19 and 20 is recognized. The decoder converts the data, which are present in serial form and given sound frequency or phase coding, into bit information, which can then be processed in the microprocessor of the building block 7.

The task of the signal input and output stage 12, depicted in a divided manner in FIG. 3, is, as in the solution in FIG. 2, a parallel processing of the signals in the signal input stage 21 and a forwarding of the untreated signals from the terminal amplifiers 19 and 20 to a control signal output stage 22, which essentially consists of a damping link. The signal separation stage, as part of the decoder in the decoder and control unit 23, now regulates the signal flow in such a way that, in the case of audio signals being present, the signal output stage 22 forwards undamped signals to the speakers 2 and 3, and in the case of data signals being present, the decoder and control unit 23 receives signals from the signal input stage 21 for conversion into bit information. Simultaneously, the signal output stage 22 acts as a damping ink for suppression of the acoustical restitution of the data signal flow in the speakers 2 and 3

The layouts depicted in FIGS. 2 and 3 are usable in a single channel, or in a twin channel operational mode concerning the data transmittal between the radio cassette device 9 and the vehicle information apparatus 4.

In a single channel processing of the information to be transmitted by the audio data carrier 6 to the vehicle information apparatus 4, only one speaker terminal amplifier is coupled to the signal input and output stage 12. Thus, there exists the possibility to issue, in parallel with the data transmittal on the channel coupled to the signal input and output stage 12, instructions accompanying these, or continuous information without impairing the data loading process.

This operational mode can, for instance, constitute a helpful support during service work, in the course of which, in parallel with a data loading process, interactions in the region of the building block 7 specifically dedicated to the taximeter or through the operator controls of the display device 5 are required.

In a single or multi-channel coupling between the radio cassette device 9 and the vehicle information apparatus 4, at least two outputs of the speaker terminal amplifiers 19 and 20 are coupled with the signal input and output stage 12. Thus there exists the possibility of utilizing data signals with high information density or high data security during transmittal to the signal input and output stage 12 in the vehicle information apparatus 4. The one channel transmits, for instance, the "normal" data through line 17, while the second channel transmits data security information, such as inverse data or continuous parallel CRC (Cycling-redundant-check) information through the line 18.

In an actual application of the vehicle information apparatus 4 in a taxi, the vehicle contains the building block 7 of a taximeter and is coupled to a standard cassette set for playback of standard tape cassettes and with a display device 5 with point matrix display 28 arranged in a manual control area of the taxi. The vehicle information apparatus 4 is wired in parallel by means of associated signal inputs with speakers 2 and 3 of the radio cassette set 9. The equipment combination coupled in such a manner can be operated in two operational modes.

In a first operational mode, the combination operates similar to a taximeter solely for computation of the fare price during a trip, or the display of control counter data and other service data. Simultaneously, the radio cassette set 9 is autonomously in operational readiness for receiving a radio transmission or in the playback operation of a music tape cassette.

In a second operational mode, the taximeter function is being maintained and is supplemented by the crossplaying of data information into the vehicle information apparatus 4 from an audio data carrier 6 in the form of a cassette for the radio cassette set 9. In actual practice, the taxi driver is issued a data cassette at the start of a shift, which, for instance, is loaded with data for appointment orders for the whole sequence of the day. After having taken over the vehicle, the driver inserts the data cassette into the operating mechanism 1 of the radio cassette set 9. After starting the data cassette, an instruction is given through the speakers 2 and 3, for example "Switch on ignition". The information "Free" specific to the taximeter must appear on the display device. After a preset reaction time, there occurs the transmittal of the data from the cassette into the vehicle information apparatus 4. The end of the correct data transmittal, and also an error in transmission, appears on the display 28 of the display device 5. A suggestion is issued also through the speakers 2 and 3, for instance, "Data transmittal terminated, consult reading on the display, restart cassette in case of erroneous message".

After the data transmittal has correctly occurred, the taxi operation can be initiated. In the course of the shift, the vehicle information apparatus 4 compares the actual time period of the internal autonomous clock 13 with the previously recorded data which are stored in a RAM of the building block 7 specific to the taximeter. If a fare order defined by a specific time period is recognized, then there occurs an appropriate indication on the display 28, for instance in the following depicted readable form: Appointment trip 11.30 hours from Hafenstrasse 30 to Rosenplatz 3 for Mr. Muller.

Such a display is accompanied by a buzzing or beeping sound of the display device 5.

After termination of the shift, the audio data carrier 6, or in this case, the data cassette, is again returned to the central office and can be loaded with new data for the following driver's shift.

What is claimed is:

1. An arrangement for use in a vehicle of a taximeter type vehicle information apparatus for recording, computation and display of data ascertainable from driving performance, comprising a transmitter module in the vehicle for making available data depending on the vehicle use, a central processing unit in the vehicle with an internal program memory and a data memory, and a display device connected to the central processing unit, in combination with an operating mechanism in the vehicle for reproducing information including digital data stored in an audio data carrier and simultaneously connected with the vehicle information apparatus, means for transmitting digital data stored on the audio data carrier from the operating mechanism to the vehicle information apparatus, and means in the vehicle information apparatus for receiving and transforming said digital data for display on said display device.

2. An arrangement according to claim 1, characterized in that the audio data carrier is a compact disk and said operating mechanism is part of a compact disk reproducing device, wherein information stored on said compact disk is transmittable to said vehicle information apparatus through actuation of said compact disk reproducing device.

3. An arrangement according to claim 1, characterized in that the audio data carrier is a magnetic tape data cassette and said operating mechanism is part of a radio cassette reproducing device, wherein information stored on said magnetic tape is transmittable to said vehicle information apparatus through actuation of said radio cassette reproducing device.

4. An arrangement according to claim 2 or 3, characterized in that a speaker terminal amplifier of the operating mechanism is coupled to said vehicle information apparatus for supplying the stored information from the audio data carrier, which information is in the form of serial data in phase modulation recording.

5. An arrangement according to claim 4, characterized in that said vehicle information apparatus includes a signal input and output stage to which said speaker terminal amplifier is connected.

6. An arrangement according to claim 5, characterized in that said vehicle information apparatus includes a decoder and control unit is said signal input and output stage for detecting whether said stored information is digital data or oral/music recordings.

7. An arrangement according to claim 1, characterized in that the vehicle information apparatus is a taximeter, and the audio data carrier is provided for storing and transmittal of tariff data into the vehicle information apparatus, said tariff data being based on a computation of trip performance in the vehicle information apparatus.

8. An arrangement according to claim 1, characterized in that the vehicle information apparatus is a taximeter, and said audio data carrier functions as a mobile and changeable additional memory from said taximeter and stores data including topical information displayable on said display device, and means in said taximeter for causing said display device to display said displayable information.

9. An arrangement according to claim 8, characterized in that topical traffic connections, changed traffic guides and time indications are displayable in the display device under control of the vehicle information apparatus by deriving the necessary information from data loaded in the audio data carrier.

10. An arrangement according to claim 9, characterized in that said display device is a point matrix display upon which textual information and symbolic street maps are graphically displayed with data contained on the audio data carrier.

11. An arrangement according to claim 8, characterized in that said audio data carrier contains currency conversion factors with which daily exchange rates may be displayed.

12. An arrangement according to claim 8, characterized in that said vehicle information apparatus further includes an autonomous clock with which character and text information for perception of a fixed preset order is displayable at a topical point in time by means of appointment data stored on said audio data carrier.

13. An arrangement according to claim 8, characterized in that said audio data carrier contains a combination of digital and analog data, wherein operator guidance is provided through spoken words in the course of handling, during loading of digital data and during a search of data segments.

14. In combination inside a vehicle: a taximeter having a central processing unit, internal program and data memory, and a display for displaying fare information computed by the central processing unit based upon use of the vehicle; and a cassette or compact disk player for receiving an audio data carrier on which is recorded topical data for use by a vehicle operator or passenger; means for connecting audio outputs of the player to inputs of the taximeter; and means in the taximeter for separating any digital data received from the player and for processing same for display on the taximeter display.

* * * * *